(12) United States Patent
Chou et al.

(10) Patent No.: US 6,900,644 B2
(45) Date of Patent: May 31, 2005

(54) CAPACITIVE FINGERPRINT SENSOR AGAINST ESD DAMAGE AND CONTAMINATION INTERFERENCE

(75) Inventors: Bruce C. S. Chou, Hsin Chu (TW); Wallace Y. W. Cheng, Hsin Chu (TW); Chen-Chih Fan, Chu Pei (TW)

(73) Assignee: Ligh Tuning Tech. Inc., Hsinchu (TW)

( * ) Notice: Subject to any disclaimer, the term of this patent is extended or adjusted under 35 U.S.C. 154(b) by 85 days.

(21) Appl. No.: 10/429,733

(22) Filed: May 6, 2003

(65) Prior Publication Data

US 2004/0222802 A1 Nov. 11, 2004

(51) Int. Cl.⁷ ............................................. G01R 27/26
(52) U.S. Cl. ....................... 324/661; 324/658; 324/663; 324/686
(58) Field of Search ................................ 324/661, 658, 324/663, 686

(56) References Cited

U.S. PATENT DOCUMENTS

| | | | |
|---|---|---|---|
| 5,325,442 A | * 6/1994 | Knapp | 382/124 |
| 5,514,612 A | * 5/1996 | Rao et al. | 438/382 |
| 6,114,862 A | 9/2000 | Tartagni et al. | 324/662 |
| 6,515,488 B1 | * 2/2003 | Thomas | 324/662 |
| 6,603,192 B2 | * 8/2003 | Thomas et al. | 257/635 |
| 6,686,546 B2 | * 2/2004 | Chiu | 178/18.01 |
| 6,762,470 B2 | * 7/2004 | Siegel et al. | 257/414 |

* cited by examiner

Primary Examiner—Anjan Deb
Assistant Examiner—John Teresinski
(74) Attorney, Agent, or Firm—Birch, Stewart, Kolasch & Birch, LLP

(57) ABSTRACT

A capacitive fingerprint sensor against ESD damage and contamination interference includes a substrate, a plurality of plate electrodes, a metal mesh, a plurality of ESD units, a plurality of bonding pads, and a protection layer. The plate electrodes, bonding pads and metal mesh are positioned on the substrate at the same level, and are composed of the same material. The ESD units are connected to the metal mesh that is conducted to the ground, and are exposed via a plurality of first openings. Thus, electrostatic charges from a finger may be discharged through this path to the ground. The metal mesh is covered by the protection layer and is not exposed. The number of the ESD units is far less than that of the plate electrodes so as to reduce the contamination interference on the captured fingerprint image.

11 Claims, 9 Drawing Sheets

20KV, After Test

20KV, Before Test

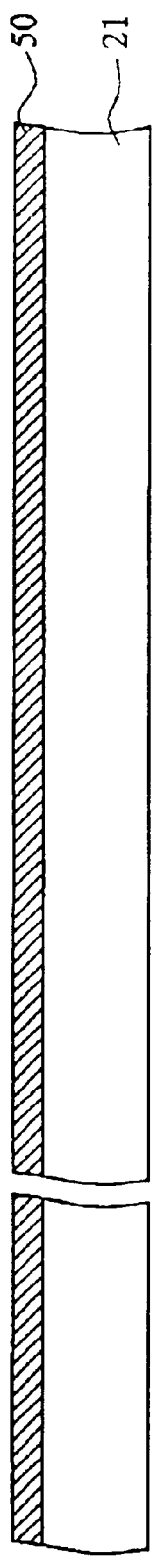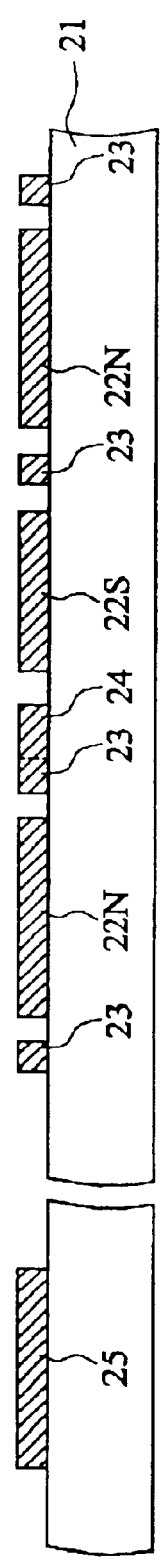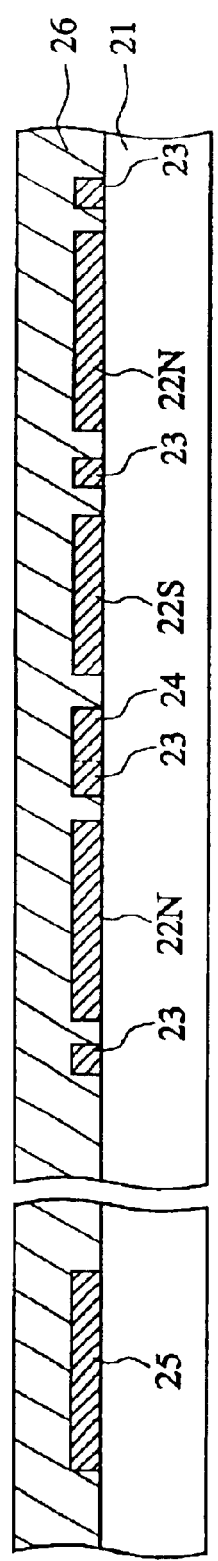

CAPACITIVE FINGERPRINT SENSOR AGAINST ESD DAMAGE AND CONTAMINATION INTERFERENCE

BACKGROUND OF THE INVENTION

1. Field of the Invention

The invention relates to a capacitive fingerprint sensor and a method for manufacturing the same, and more particularly to a capacitive fingerprint sensor against ESD damage and contamination interference and a method for manufacturing the same.

2. Description of the Related Art

There are many known techniques of identifying an individual through the identification of the individual's fingerprint. The use of an ink pad and the direct transfer of ink by the thumb or finger from the ink pad to a recording card is the standard way of making this identification. Then, an optical scanner scans the recording card to get an image, which is then compared to fingerprint images in the computer database. However, the most serious drawback of the above-mentioned method is that the fingerprint identification cannot be processed in real-time, and thus cannot satisfy the requirement of real-time authentication, such as network authentication, e-business, portable electronics products, personal ID card, security system, and the like.

The method for reading a fingerprint in real-time has become the important technology in the biometrics market. Conventionally, an optical fingerprint sensor may be used to read a fingerprint in real-time. However, the optical fingerprint sensor has a drawback because it is large in size.

Consequently, silicon fingerprint sensors, which overcome the drawbacks of the optical sensor and are formed by silicon semiconductor technology, are developed. According to the consideration of silicon integrated circuit (IC) processes, the capacitive fingerprint sensor has become the most direct and simple product.

Structurally speaking, the capacitive fingerprint sensor includes a plurality of capacitive sensing members arranged in a 2D array. When a finger contacts the exposed surfaces of the sensing members, capacitance curves corresponding to the ridges of the finger may be sensed. Because most of the sensor surface has to be exposed to the outside, any approaching charged body may cause shorted circuit or permanent damage to the circuit in the sensor. Consequently, it is quite important for the sensor surface to possess the ability against the electrostatic discharge (ESD) damage. In addition, it is necessary to prevent the contamination interference from influencing the captured image quality.

A method for avoiding the ESD damage to the fingerprint sensor is disclosed in U.S. Pat. No. 6,114,862 to Tartagni et. al. and U.S. Pat. No. 6,515,488 to Thomas, the disclosures of which are hereby incorporated by reference.

Referring to FIGS. 1 to 3, the above-mentioned method for avoiding the ESD damage utilizes a tungsten metal mesh 113, which surrounds each capacitive sensing member and is exposed to the outside, to conduct the electrostatic charges of an approaching body to the ground, which method may effectively solve the problem of ESD damage. However, the method and design for forming the tungsten metal mesh 113 may cause other problems. The plate electrodes 112 and the tungsten metal mesh 113 are positioned above the substrate 110 at different levels and are formed by different materials in different manufacturing processes. After the steps of depositing and then etching back the tungsten metal, several small cavities 108, which are regarded as defects and may cause problems such as stress concentration and the like, are formed on the protection layer 111 of the sensor surface. When the fingernail unintentionally hits the external surface 109 of the sensor, the sensor may be damaged. Furthermore, the small cavities 108 make the surface of the protection layer hydrophilic. Thus, the moisture of the finger tends to diffuse after the finger contacts the external surface 109, and the image quality is deteriorated accordingly. Consequently, Thomas discloses a method for filling the small cavities 108 with the silicon oxide 107 so as to make the external surface 109 smooth by depositing the silicon oxide 107 followed by the CMP process. However, this way makes the manufacturing processes too complicated and is not suitable for the general manufacturing procedures of the commercial IC foundry.

Furthermore, the above-mentioned technology also causes the problem that the finger contamination may interfere the image quality. As shown in FIG. 2, when the finger 1, which may be regarded as a virtual ground, contacts the external surface 109 of the sensor, the sensed capacitance formed between the ridge 11 and the plate electrode 112 is greater than that formed between the valley 12 and the plate electrode 112. The electrostatic charges of the finger 1 may be discharged via the tungsten metal mesh 113, and the fully exposed tungsten metal mesh 113 connects the residual contamination 114 of the finger to the ground. Then, a contamination capacitance 115 is indirectly formed to interfere the image quality, as shown in FIG. 3.

SUMMARY OF THE INVENTION

It is therefore an object of the invention to provide a capacitive fingerprint sensor against ESD damage and contamination interference and a method for manufacturing the same.

To achieve the above-mentioned object, the invention provides a capacitive fingerprint sensor against ESD damage and contamination interference. The sensor includes a silicon substrate having integrated circuits, a plurality of plate electrodes, a metal mesh, a plurality of ESD units, a plurality of bonding pads, and a protection layer. The plate electrodes are arranged on the substrate in a form of a 2D array. The metal mesh crisscrosses between the plate electrodes and is flush with the plate electrodes. The metal mesh surrounds each of the plate electrodes and is connected to a ground. The ESD units are connected to the metal mesh, each of the ESD units is formed between a predetermined number of adjacent plate electrodes in the plate electrodes, and the number of the ESD units is far less than that of the plate electrodes. The bonding pads serve as input and output portions for the capacitive fingerprint sensor. The protection layer completely covers the plate electrodes and the metal mesh and partially covers the ESD units and the bonding pads so as to form a plurality of first openings on the ESD units and a plurality of second openings on the bonding pads. A dimension of each of the first openings is smaller than that of each of the second openings.

To achieve the above-mentioned object, the invention also provides a method for manufacturing a capacitive fingerprint sensor against ESD damage and contamination interference. The method includes the steps of:

forming a laminated metal layer on a silicon substrate having integrated circuits;

removing a part of the laminated metal layer to form:

a plurality of plate electrodes arranged on the substrate in a form of a 2D array;

a metal mesh crisscrossing between the plate electrodes and being flush with the plate electrodes so as to surround each of the plate electrodes;

a plurality of ESD units connected to the metal mesh, each of the ESD units being formed between a predetermined number of adjacent plate electrodes in the plate electrodes, and the number of the ESD units being far less than that of the plate electrodes; and a plurality of bonding pads serving as input and output portions for the capacitive fingerprint sensor;

depositing a protection layer on the laminated metal layer and the substrate;

forming a photoresist layer on the protection layer;

forming a plurality of first windows and a plurality of second windows on the photoresist layer so as to expose the protection layer via the first windows and the second windows;

dry-etching the exposed protection layer to form a plurality of first openings corresponding to the first windows and a plurality of second openings corresponding to the second windows, to expose the bonding pads via the second openings, and to expose the ESD units via the first openings, a dimension of each of the first openings being smaller than that of each of the second openings; and removing the photoresist layer.

BRIEF DESCRIPTION OF THE DRAWINGS

FIGS. 12A to 12E show the steps for manufacturing the capacitive fingerprint sensor of the invention, respectively.

DETAILED DESCRIPTION OF THE INVENTION

A detailed description regarding the capacitive fingerprint sensor may be found in commonly-owned, co-pending U.S. patent application Ser. No. 10/403,052, filed Apr. 1, 2003 and entitled "CAPACITIVE FINGERPRINT SENSOR," the disclosure of which is incorporated by reference as if fully set forth herein.

Figure 1:
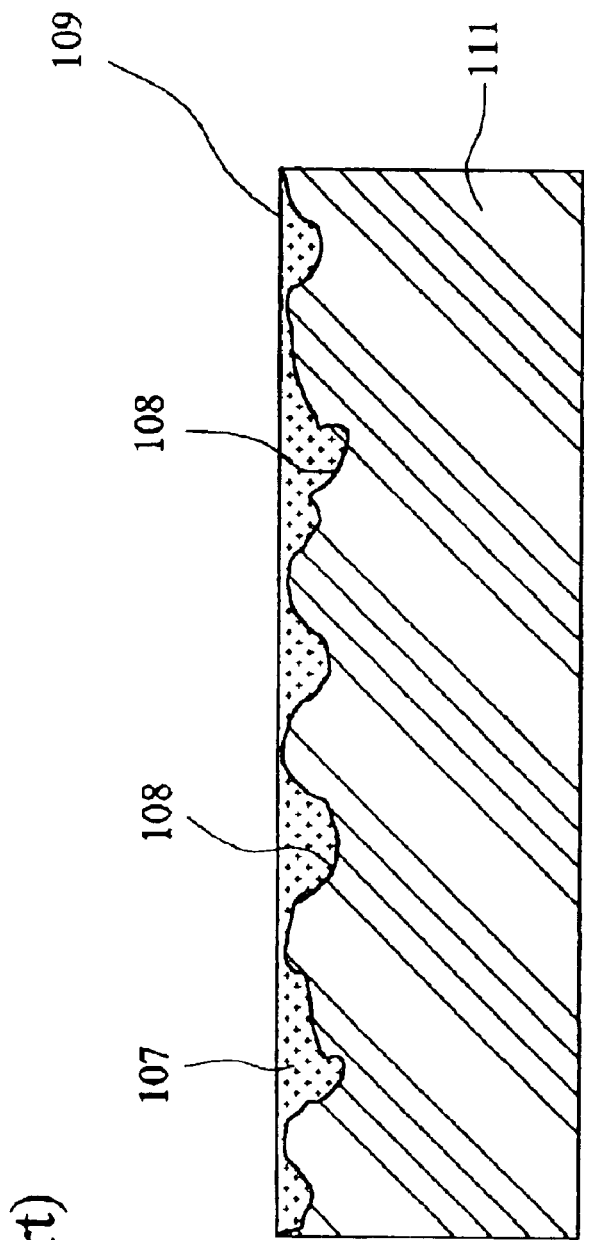
FIG. 1 is a schematic illustration showing an upper surface portion of a conventional fingerprint sensor in the prior art.
Figure 2:
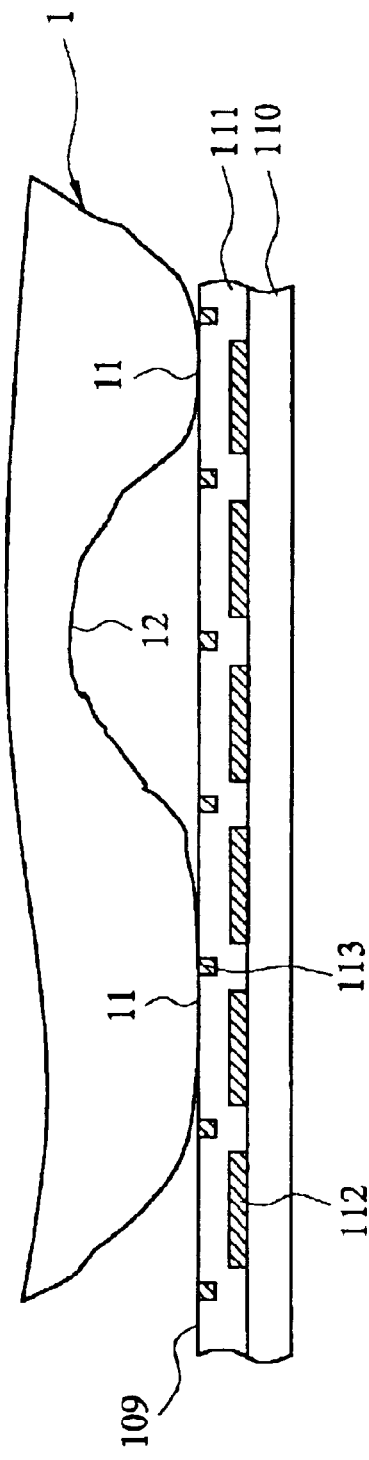
FIG. 2 is a schematic illustration showing a conventional fingerprint sensor in contact with a finger in the prior art.
Figure 3:
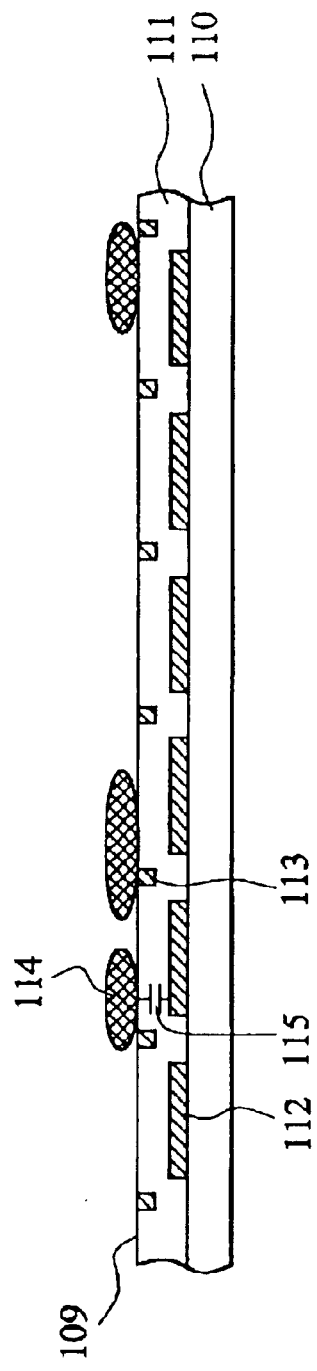
FIG. 3 is a schematic illustration showing the fingerprint sensor of FIG. 2 having contaminations left thereon in the prior art.
Figure 4:
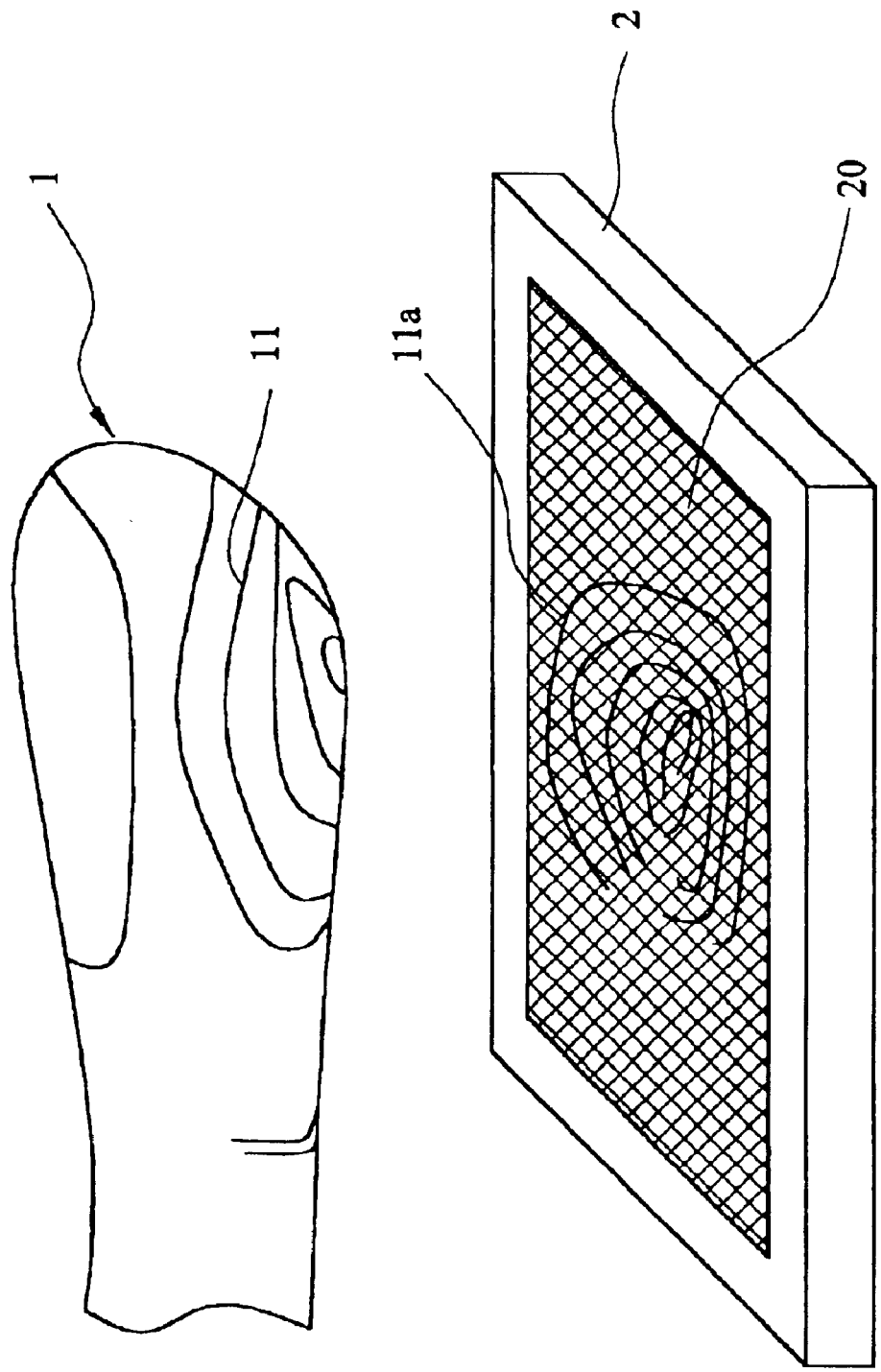
FIG. 4 is a schematic illustration showing a capacitive fingerprint sensor of the invention for reading the fingerprint.

FIG. 4 is a schematic illustration showing a capacitive fingerprint sensor of the invention for reading the fingerprint. Referring to FIG. 4, the fingerprint sensor 2 includes a plurality of capacitive sensing members 20 arranged in a 2D array. When a finger 1 contacts the sensor 2, irregular ridges 11 on the skin of the finger 1 contact the capacitive sensing members 20 and capacitance curves 11a corresponding to the ridges 11 may be obtained from the sensor 2. By measuring the capacitance curves 11a, the shape of the fingerprint ridges 11 may be obtained.

Figure 5:
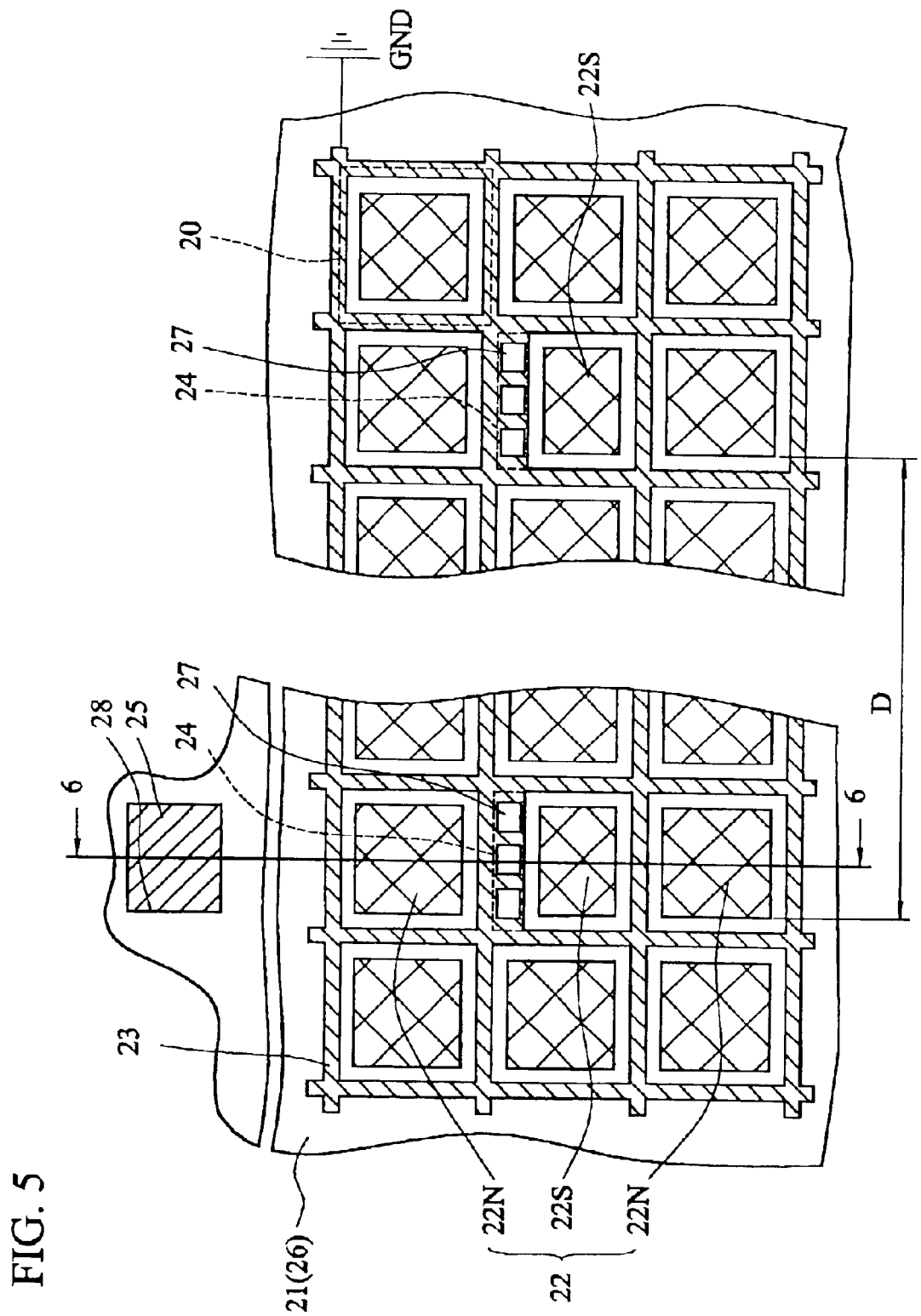
FIG. 5 is a partially schematic top view showing the capacitive fingerprint sensor according to a first embodiment of the invention.
Figure 6:
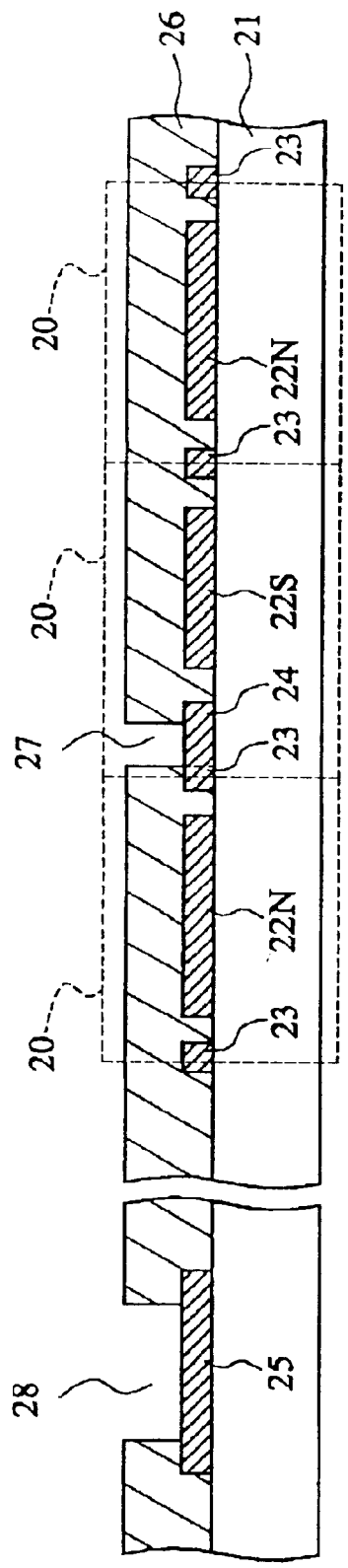
FIG. 6 is a cross-sectional view showing the capacitive fingerprint sensor taken along a line 6—6 of FIG. 5.

FIG. 5 is a partially schematic top view showing the capacitive fingerprint sensor according to a first embodiment of the invention. FIG. 6 is a cross-sectional view showing the capacitive fingerprint sensor taken along a line 6—6 of FIG. 5. Referring to FIGS. 5 and 6, the capacitive fingerprint sensor 2 of the invention basically includes a silicon substrate 21 having integrated circuits, a plurality of plate electrodes 22, a metal mesh 23, a plurality of ESD (electrostatic discharge) units 24, a plurality of bonding pads 25, and a protection layer 26. The plate electrodes 22 are arranged on the substrate 21 in a form of a 2D array. The metal mesh 23 surrounding each of the plate electrodes 22 is formed between the plate electrodes 22 and is flush with the plate electrodes 22. In detail, the metal mesh 23 crisscrosses between the plate electrodes 22 and is positioned in the spacings between the plate electrodes 22. The plate electrodes 22 are separated from the metal mesh 23 by predetermined spacings. The bonding pads 25 serve as input and output portions for the capacitive fingerprint sensor 2. The metal mesh 23 is connected to a ground GND in order to conduct the electrostatic charges to the ground GND and prevent the sensor from the ESD damage. The ESD units 24 are connected to the metal mesh 23 and are grounded accordingly. A distance D between two adjacent ESD units 24 is far greater than the spacing between two adjacent plate electrodes 22, so the number of the ESD units 24 is far less than that of the plate electrodes 22.

The protection layer 26 completely covers the plate electrodes 22 and the metal mesh 23, and partially covers the ESD units 24 and the bonding pads 25. The protection layer 26 is formed with a plurality of first openings 27 above the ESD units 24 and a plurality of second openings 28 above the bonding pads 25. It is to be noted that the dimension of each first opening 27 is far smaller than that of each second opening 28.

Typically, the protection layer 26 may be a dielectric layer formed in the CMOS manufacturing processes. The conventional material may be a silicon oxide layer and a silicon nitride layer laminated together. The laminated layers have a thickness of 0.8 to 1.2 microns, which depends on the selected manufacturing processes. However, in order to increase the lifetime of the fingerprint sensor and to enhance the ability against ESD damage, a high-hardness layer having a thickness of 0.3 to 2 microns may be added onto the protection layer 26. The high-hardness layer in this embodiment is a diamond-like carbon film and a silicon carbide film. It also may be a barium titanate film, a strontium titanate film and a tantalum oxide film.

As clearly shown in FIG. 5, some plate electrodes sacrifice their sensing areas in order to form the ESD units 24 without influencing the sensor effects. Thus, the plate electrodes 22 include a plurality of sacrificial electrodes 22S and a plurality of standard electrodes 22N. The sacrificial electrodes 22S are adjacent to the ESD units 24 and the dimension of each sacrificial electrode 22S is smaller than that of each standard electrode 22N. In this embodiment, each ESD unit 24 is only adjacent to one sacrificial electrode 22S. Thus, there is only one sacrificial electrode 22S among nine plate electrodes 22.

The plate electrodes 22 and the metal mesh 23 may be made of the same material. For example, the plate electrodes 22 and the metal mesh 23 may be a laminated aluminum layer 30 or a laminated copper layer. The laminated aluminum layer 30 is the topmost metal film formed in the IC (integrated circuit) manufacturing processes. In this embodiment, the area of the plate electrode 22 equals to 40 microns*40 microns, and the area of the capacitive sensing member 20 equals to 50 microns*50 microns. A sense capacitance is formed between each plate electrode 22 and the finger 1, and the metal mesh 23 is used for avoiding ESD damage.

When the finger approaches the sensor, the electrostatic charges may be conducted from the first openings 27 to the ground GND via the metal mesh 23. In this embodiment, the optimum spacing D between two adjacent ESD units 24 ranges from 500 to 1000 microns.

Figure 7:
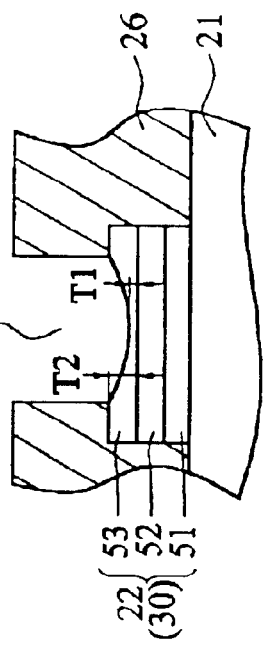
FIG. 7 is an enlarged schematic illustration showing the bonding pad of FIG. 6.
Figure 8:
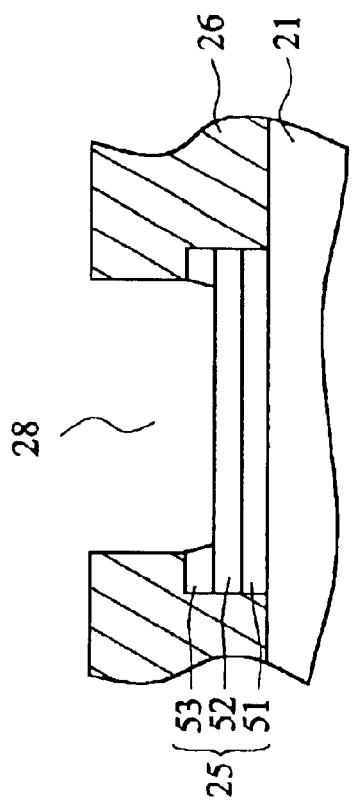
FIG. 8 is an enlarged schematic illustration showing the ESD unit of FIG. 6.

FIG. 7 is an enlarged schematic illustration showing the bonding pad of FIG. 6. FIG. 8 is an enlarged schematic illustration showing the ESD unit of FIG. 6. Referring to FIGS. 7 and 8, the laminated aluminum layer 30 includes a titanium layer 51 arranged on the substrate 21, an aluminum alloy layer 52 arranged on the titanium layer 51, and a titanium nitride layer 53 arranged on the aluminum alloy layer 52. The aluminum alloy layer 52 is exposed via each first opening 27. Each bonding pad 25 includes a titanium layer 51 arranged on the substrate 21, an aluminum alloy layer 52 arranged on the titanium layer 51 and exposed via each second opening 28, and a titanium nitride layer 53 arranged on the aluminum alloy layer 52 and surrounding each the second opening 28. It is to be noted that a middle thickness T1 of the titanium nitride layer 53 in each first opening 27 is smaller than a peripheral thickness T2 of the titanium nitride layer 53 in the first opening 27, and the titanium nitride layer 53 in each second opening 28 is substantially completely removed owing to the property of the etching process, which will be described later.

Figure 9:
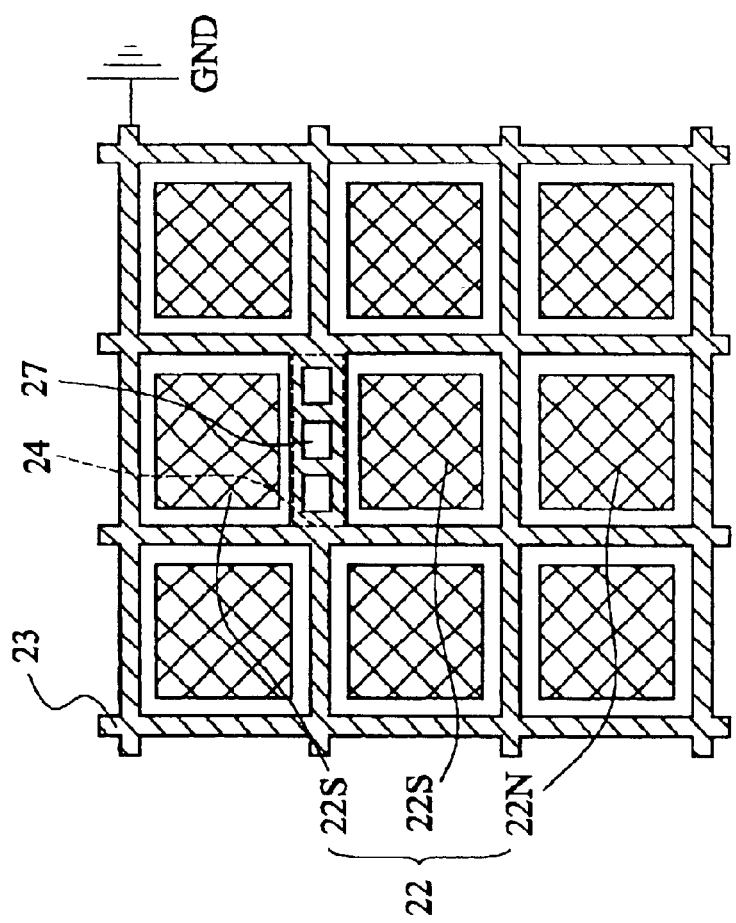
FIG. 9 is a schematic top view showing the capacitive fingerprint sensor according to a second embodiment of the invention.

FIG. 9 is a schematic top view showing the capacitive fingerprint sensor according to a second embodiment of the invention. The sensor of FIG. 9 is similar to that of FIG. 5 except for the difference residing in that each ESD unit 24 of FIG. 9 is only adjacent to two sacrificial electrodes 22S. That is, each of the two adjacent plate electrodes 22 sacrifices a region to be used by the ESD unit 24.

Figure 10:
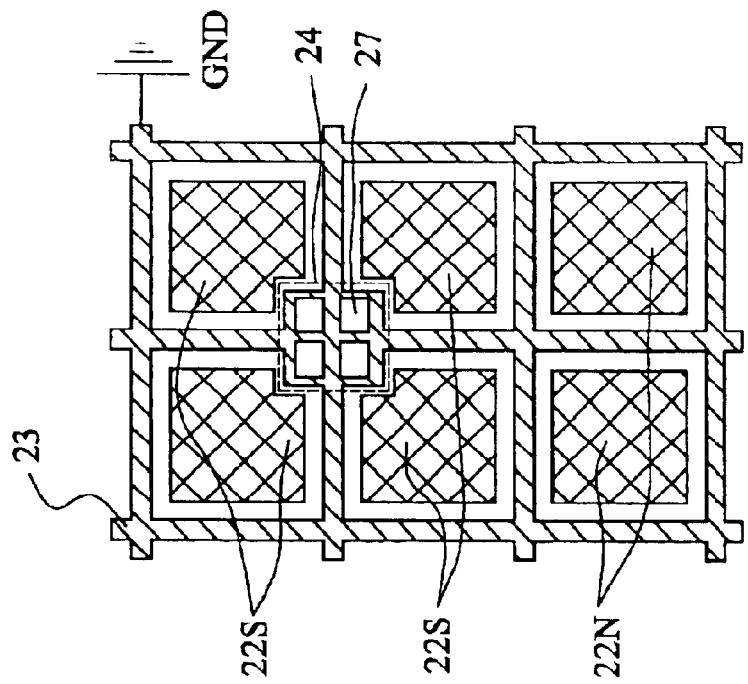
FIG. 10 is a schematic top view showing the capacitive fingerprint sensor according to a third embodiment of the invention.

FIG. 10 is a schematic top view showing the capacitive fingerprint sensor according to a third embodiment of the invention. The sensor of FIG. 10 is similar to that of FIG. 5 except for the difference residing in that each ESD unit 24 of FIG. 10 is only adjacent to four sacrificial electrodes 22S. That is, each of the four adjacent plate electrodes 22 sacrifices a region to be used by the ESD unit 24.

Figure 11B:
FIGS. 11A and 11B show the sensed results of the capacitive fingerprint sensor of the invention before and after 20 KV ESD testing, respectively.
Figure 11A:

FIGS. 11A and 11B show the sensed results of the capacitive fingerprint sensor of the invention before and after the ESD testing, respectively. The test condition adopted in the invention resides in that +/−20 KV are applied ten times in the air mode with an interval of one second. Compared FIG. 11A to FIG. 11B, the sensing result of FIG. 11B after the test is not visibly damaged, which means that the sensor still can work normally after the test. Consequently, the fingerprint sensor of the invention has the ability against ESD damage up to 20 KV, and the internal circuit of the sensor does not fail.

FIGS. 12A to 12E show the steps for manufacturing the capacitive fingerprint sensor of the invention, respectively.

As shown in FIG. 12A, a laminated metal layer 50 is formed on a silicon substrate 21 having integrated circuits.

Next, as shown in FIG. 12B, a portion of the laminated metal layer 50 is removed to form a plurality of plate electrodes 22, a metal mesh 23, a plurality of ESD units 24, and a plurality of bonding pads 25. The structure of each of the above-mentioned elements and the relationship therebetween have been described above, and detailed description thereof will be omitted.

Then, as shown in FIG. 12C, a protection layer 26 is deposited on the laminated metal layer 50 and the substrate 21. In this embodiment, the protection layer 26 includes a silicon oxide layer and a silicon nitride layer, both of which are laminated together. Therefore, the silicon oxide layer may be deposited on the laminated metal layer 50 and the substrate 21, and then the silicon nitride layer may be deposited on the silicon oxide layer.

Figure 12D:
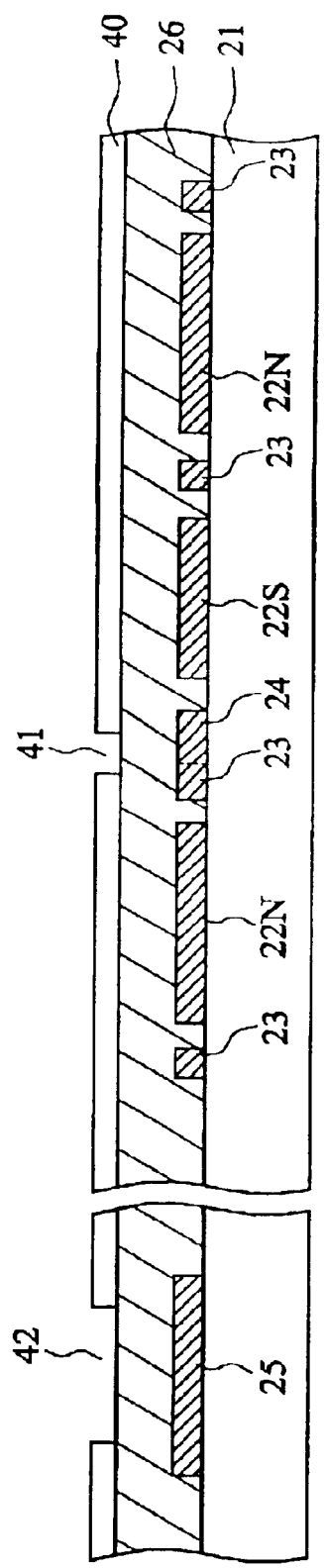

Next, as shown in FIG. 12D, a photoresist layer 40 is formed on the protection layer 26. Then, a plurality of first windows 41 and a plurality of second windows 42 are formed in the photoresist layer 40 such that the protection layer 26 may be exposed via the first windows 41 and the second windows 42.

Figure 12E:
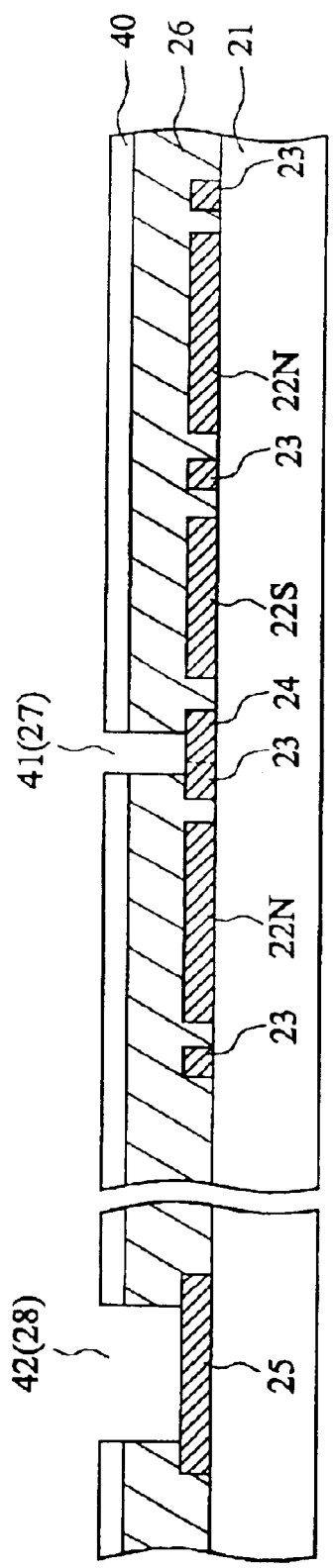

Then, as shown in FIG. 12E, the exposed protection layer 26 is dry-etched to form a plurality of first openings 27 corresponding to the first windows 41 and a plurality of second openings 28 corresponding to the second windows 42. Accordingly, the bonding pads 25 are exposed via the second openings 28, the ESD units 24 are exposed via the first openings 27, and the dimension of each first opening 27 is far smaller than that of each second opening 28. In the dry-etching process, when the titanium nitride layer 53 in the second openings 28 is completely removed, a portion of the titanium nitride layer 53 in the first openings 27 may be removed such that a middle thickness T1 of the titanium nitride layer 53 in each first opening 27 is smaller than a peripheral thickness T2 of the titanium nitride layer 53 in the first opening 27, as shown in FIG. 8. It is to be noted that the protection layer 26 may further include the above-mentioned high-hardness layer positioned on the titanium nitride layer 53. In this case, the high-hardness layer may be regarded as a part of the protection layer 26.

Next, the photoresist layer 40 is removed to form the structure as shown in FIG. 6.

According to the above-mentioned structure and method, the protection layer 26 will never be exposed to the etching environment after it is deposited because the metal mesh 23 is configured to be arranged below the protection layer 26. Even in the processes for forming the openings 27 and 28, the photoresist layer 40 is still arranged on the protection layer 26 to protect the protection layer 26 from any damage. Hence, no micro-cavity like those in the prior art, which tends to cause stress concentration, hydrophilic surfaces, ESD damage, unintentional damage, and contamination interference, will be formed.

In addition, the first openings 27 for the ESD units 24 and the second openings 28 for the bonding pads 25 are formed using the same mask, but the dimension of each first opening 27 is far smaller than that of each second opening 28. For example, the dimension of the first opening 27 typically ranges from 5 to 10 microns, and that of the second opening 28 typically ranges from 100 to 150 microns. Consequently, in the formation of the openings, the protection layer 26 can be completely removed to form the second openings 28, and the topmost titanium nitride layer 53 also may be completely removed with the aluminum alloy layer 52 completely exposed so as to facilitate the subsequent wire bonding process. One of ordinary skill in the art may easily understand that the dry-etching method for forming the openings has loading effects, which means that the smaller opening is etched in a lower speed. The invention utilizes this property to remain partial titanium nitride layer 53 (0.1 microns thick) inside the first opening 27 by controlling the etching time. Since the titanium nitride layer 53 is stable in oxidized environment and chemically resistant, it is suitable for long-term exposure to the air. Consequently, the electrostatic charges of an object approaching the sensor may be conducted to the ground through the first openings 27, the titanium nitride layer 53, and the aluminum alloy layer 52, and the ESD damage can be avoided accordingly.

The above-mentioned manufacturing processes include no complicated processes as used in the prior art, and the sensor of the invention may be manufactured using standard processes and materials as used in the commercial integrated circuit foundry.

The advantages of the invention are described as follows. The sensor possesses the ability against ESD damage by using only a few amount of ESD units separating from one another in a large spacing. Even if the contaminations are left on the sensor, most contaminations are independent and are not connected to the metal mesh 23. Thus, the interference on the sensed image caused by the contamination capacitance may be reduced.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A capacitive fingerprint sensor against ESD damage and contamination interference, comprising:
    a silicon substrate having integrated circuits;
    a plurality of plate electrodes arranged on the substrate in a form of an array;
    a metal mesh crisscrossing between the plate electrodes and being flush with the plate electrodes, the metal mesh surrounding each of the plate electrodes and being connected to a ground;
    a plurality of ESD units connected to the metal mesh, each of the ESD units being formed between a predetermined number of adjacent plate electrodes in the plate electrodes, and the number of the ESD units being less than that of the plate electrodes;
    a plurality of bonding pads serving as input and output portions for the capacitive fingerprint sensor; and
    a protection layer completely covering the plate electrodes and the metal mesh and partially covering the ESD units and the bonding pads so as to form a plurality of first openings on the ESD units and a plurality of second openings on the bonding pads, a dimension of each of the first openings being smaller than that of each of the second openings, the plate electrodes comprising a plurality of sacrificial electrodes and a plurality of standard electrodes, the sacrificial electrodes being adjacent to the ESD units, a dimension of each of the sacrificial electrodes being smaller than that of each of the standard electrodes.

2. The capacitive fingerprint sensor according to claim 1, wherein the plate electrodes and the metal mesh are composed of the same material.

3. The capacitive fingerprint sensor according to claim 2, wherein each of the plate electrodes comprises a laminated aluminum layer.

4. The capacitive fingerprint sensor according to claim 3, the laminated aluminum layer comprises:
    a titanium layer arranged on the substrate;
    an aluminum alloy layer arranged on the titanium layer; and
    a titanium nitride layer arranged on the aluminum alloy layer and partially exposed via each of the first openings.

5. The capacitive fingerprint sensor according to claim 2, wherein each of the plate electrodes comprises a laminated copper layer.

6. The capacitive fingerprint sensor according to claim 1, wherein only one sacrificial electrode is adjacent to each of the ESD units.

7. The capacitive fingerprint sensor according to claim 1, wherein only two sacrificial electrodes are adjacent to each of the ESD units.

8. The capacitive fingerprint sensor according to claim 1, wherein only four sacrificial electrodes are adjacent to each of the ESD units.

9. The capacitive fingerprint sensor according to claim 1, wherein the protection layer is composed of an silicon oxide layer and a silicon nitride layer laminated together.

10. The capacitive fingerprint sensor according to claim 1, wherein a spacing between two adjacent ESD units substantially ranges from 500 to 1000 microns.

11. The capacitive fingerprint sensor according to claim 1, further comprising:
    a high-hardness layer on the protection layer, the high-hardness layer is selected from one of a group consisting of a diamond-like carbon film, a silicon carbide film, a barium titanate film, a strontium titanate film, and a tantalum oxide film.

* * * * *